United States Patent
Carson et al.

(10) Patent No.: US 9,742,664 B2
(45) Date of Patent: Aug. 22, 2017

(54) SYSTEM, METHOD, AND DEVICE FOR UTILIZING NETWORK CONNECTIVITY BY COMBINING ALLOCATED BANDWIDTH FOR OPTIMIZED BROADBAND ACCESS

(71) Applicants: James A. Carson, Riverside, CT (US); Paul J. Alexandre, Vero Beach, FL (US)

(72) Inventors: James A. Carson, Riverside, CT (US); Paul J. Alexandre, Vero Beach, FL (US)

( * ) Notice: Subject to any disclaimer, the term of this patent is extended or adjusted under 35 U.S.C. 154(b) by 164 days.

(21) Appl. No.: 14/666,164

(22) Filed: Mar. 23, 2015

(65) Prior Publication Data
US 2015/0271865 A1    Sep. 24, 2015

Related U.S. Application Data

(60) Provisional application No. 61/969,349, filed on Mar. 24, 2014, provisional application No. 62/003,620, filed on May 28, 2014.

(51) Int. Cl.
*H04L 12/28* (2006.01)
*H04L 12/709* (2013.01)
(Continued)

(52) U.S. Cl.
CPC ........... *H04L 45/245* (2013.01); *H04W 28/08* (2013.01); *H04W 40/32* (2013.01); *H04W 88/18* (2013.01)

(58) Field of Classification Search
CPC .................................................... H04W 88/18
(Continued)

(56) References Cited

U.S. PATENT DOCUMENTS 6,807,178 B1 * 10/2004 Lemieux ............... H04Q 11/04
                                                                370/235
6,879,590 B2    4/2005 Pedersen et al.
(Continued)

FOREIGN PATENT DOCUMENTS

EP    2624508 A2    8/2013

*Primary Examiner* — Farah Faroul
(74) *Attorney, Agent, or Firm* — IDP Patent Services; Olav M. Underdal

(57) ABSTRACT

A system for network aggregation/disaggregation includes an aggregation/disaggregation server; an aggregation/disaggregation router; and at least one carrier network; such that the aggregation/disaggregation router aggregates individual bandwidth subscriptions to provide an aggregated bandwidth local area network connection, which is accessed by a plurality of mobile devices. An aggregation/disaggregation router can include a processor; a non-transitory memory; an input/output; a proxy connection manager; a software-defined radio; a local area network manager; and a subscriber controller; all connected via a data bus. Also disclosed is a method of network aggregation/disaggregation, including creating proxy connections; aggregating proxy connections; accessing proxy connections; disaggregating inbound network data, wherein the aggregation/disaggregation server distributes data across a plurality of network connections; and aggregating outbound network data, wherein the aggregation/disaggregation server aggregates and routes outbound data to a final internet destination.

20 Claims, 9 Drawing Sheets

(51) Int. Cl.
*H04W 28/08* (2009.01)
*H04W 40/32* (2009.01)
*H04W 88/18* (2009.01)

(58) Field of Classification Search
USPC .......................................................... 370/329
See application file for complete search history.

(56) References Cited

U.S. PATENT DOCUMENTS

| | | | |
|---|---|---|---|
| 7,720,098 B1 | 5/2010 | Allen et al. | |
| 7,805,156 B1 | 9/2010 | Allen et al. | |
| 8,130,699 B2 | 3/2012 | Stanwood et al. | |
| 8,400,923 B2 | 3/2013 | Kini | |
| 8,942,211 B2* | 1/2015 | Kawakami | H04W 48/20 370/338 |
| 8,966,270 B2* | 2/2015 | Bu | H04L 63/10 713/175 |
| 9,462,457 B2* | 10/2016 | Gao | H04W 12/06 |
| 2006/0062206 A1* | 3/2006 | Krishnaswamy | H04L 12/2856 370/352 |
| 2007/0280142 A1 | 12/2007 | Meier | |
| 2008/0259841 A1* | 10/2008 | Deshpande | H04L 45/245 370/328 |
| 2010/0195611 A1 | 8/2010 | Allen et al. | |
| 2010/0293277 A1 | 11/2010 | Rooks et al. | |
| 2012/0120962 A1 | 5/2012 | Ll et al. | |
| 2012/0236801 A1 | 9/2012 | Krishnaswamy et al. | |
| 2012/0307658 A1 | 12/2012 | Xia et al. | |
| 2013/0132562 A1 | 5/2013 | Bandyopadhyay | |
| 2013/0182601 A1* | 7/2013 | Bandyopadhyay | H04L 45/245 370/252 |
| 2015/0124676 A1* | 5/2015 | Song | H04L 1/1854 370/311 |
| 2015/0334724 A1* | 11/2015 | Faccin | H04W 48/16 370/235 |
| 2016/0119780 A1* | 4/2016 | Jung | H04W 8/205 455/419 |
| 2016/0262205 A1* | 9/2016 | Flynn | H04W 52/0212 |

* cited by examiner

Aggregation/Disaggregation Server

Dataflow with multiple devices

Dataflow for Identification Authorization

Dataflow for Multiplexed Connectivity

Method for Network Aggregation/Disaggregation

SYSTEM, METHOD, AND DEVICE FOR UTILIZING NETWORK CONNECTIVITY BY COMBINING ALLOCATED BANDWIDTH FOR OPTIMIZED BROADBAND ACCESS

CROSS-REFERENCE TO RELATED APPLICATIONS

This application claims benefit of U.S. Provisional Application No. 61/969,349 filed Mar. 24, 2014, and U.S. Provisional Application No. 62/003,620 filed May 28, 2014, both of which are incorporated herein by reference in their entirety.

FIELD OF THE INVENTION

The present invention relates generally to network access through carrier service provider access points and channels that create a network of internet connection, and more particularly to methods, systems, and devices for utilizing existing authorized connections in aggregation to create access at significantly higher rates for data throughput for use by a single or multiple users.

BACKGROUND OF THE INVENTION

Individuals and companies currently contract for access to their networks or the internet through various carriers or service providers, such as for example cellular telephone companies, cable companies, hardwired telephone for dialup or DSL, and dedicated internet service providers. Each individual or company may provide additional access points for network and internet connectivity that is accessed either by means of a hardwire connection or wirelessly through WI-FI, WIMAX, Cellular or other connectivity service or method.

These connections are often limited in speed and require individuals and companies (consumers) to subscribe to multiple service providers or carriers to establish mobile, at home and in office connectivity. At present, there is no method, system or device to repurpose and combine already existing access points, which are already being contracted and paid for by the customers. This inability to repurpose, share and combine already paid for connectivity causes customers to buy redundant services at significant cost, thereby vastly underutilizing individual network connections.

Local hardwired connections such as DSL and cable lack mobility and mobile access such as WIMAX, GSM and LTE offer limited bandwidth and limited ability to share that bandwidth across devices. Neither hardwired or wireless connections provide a means to combine already paid for and authorized bandwidth to create significantly expanded rates of data throughput.

As such, considering the foregoing, it may be appreciated that there continues to be a need for novel and improved devices and methods for utilizing existing networks to optimize broadband access.

SUMMARY OF THE INVENTION

The foregoing needs are met, to a great extent, by the present invention, wherein in aspects of this invention, enhancements are provided to the existing models of network access, by combining available bandwidth for optimized broadband access.

In an aspect, the present invention provides a means for individuals and businesses to repurpose and combine their existing authorized and paid for network and internet connections in a manner that increases available bandwidth, combines multiple wireless and wired access points, delivers registered connected and non-connected devices network access and generally improves the speed and economic efficiency for companies and individuals.

In a related aspect, when using current connection and network access, device users are limited to the bandwidth available for that device, and cannot provide portability of their access and bandwidth authorization to create, share and use multiple access authorizations, whether that bandwidth and authorization originate from different or the same carriers or service providers. The present invention provides a system, method and device to repurpose access authorization, combine assigned bandwidth and use already purchased assets in a highly efficient manner.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. In addition, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
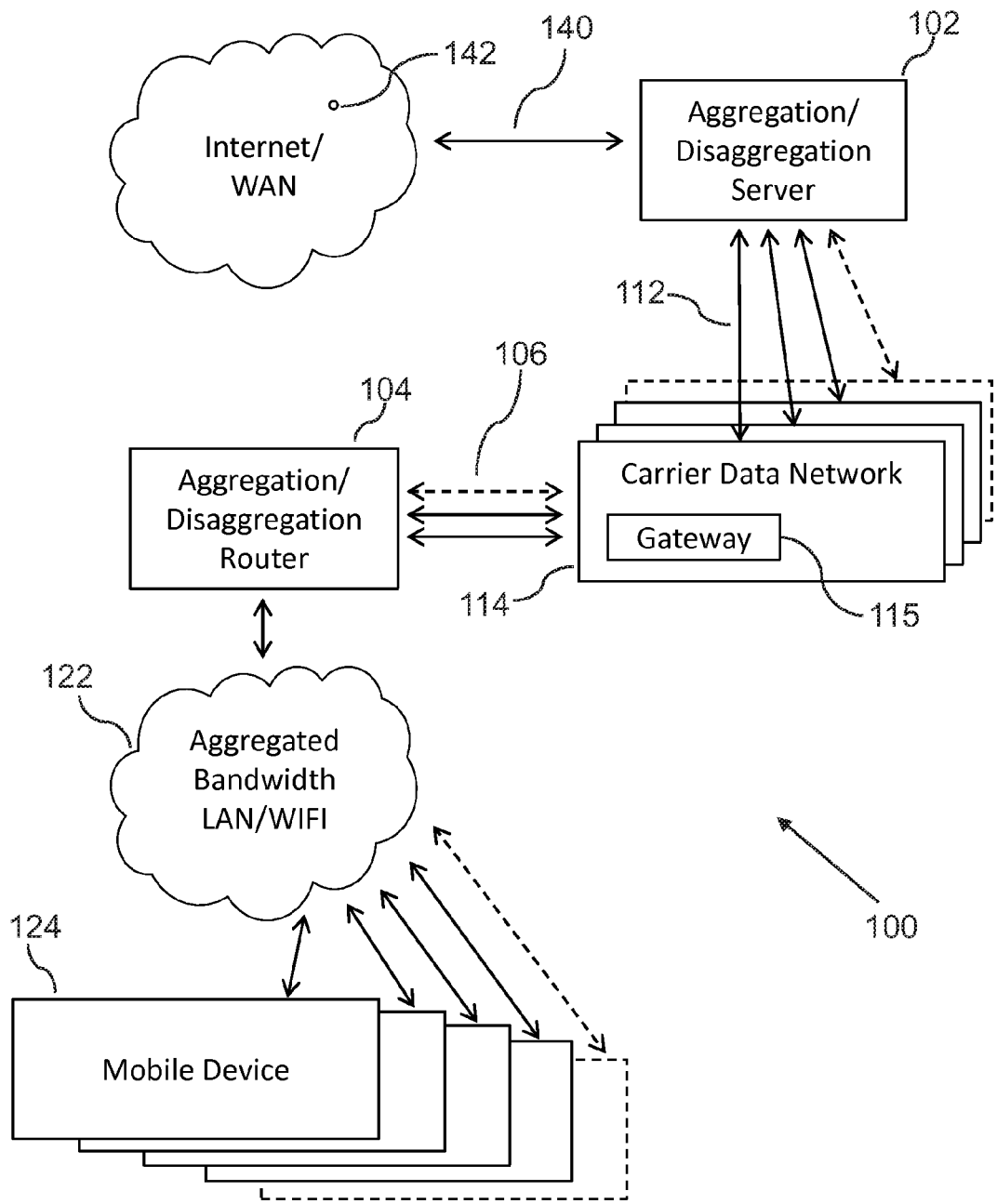
FIG. 1 is a schematic diagram illustrating a system for network aggregation/disaggregation, according to an embodiment of the invention.

Before describing the invention in detail, it should be observed that the present invention resides primarily in a novel and non-obvious combination of elements and process steps. So as not to obscure the disclosure with details that will readily be apparent to those skilled in the art, certain conventional elements and steps have been presented with lesser detail, while the drawings and specification describe in greater detail other elements and steps pertinent to understanding the invention.

The following embodiments are not intended to define limits as to the structure or method of the invention, but only to provide exemplary constructions. The embodiments are permissive rather than mandatory and illustrative rather than exhaustive.

In the following, we describe the structure of an embodiment of a system for network aggregation/disaggregation 100 with reference to FIG. 1, in such manner that like reference numerals refer to like components throughout; a convention that we shall employ for the remainder of this specification.

In an embodiment, a system for network aggregation/disaggregation 100 can include:
  a) an aggregation/disaggregation server 102;
  b) an aggregation/disaggregation router 104; and
  c) at least one carrier network 114;
  wherein the aggregation/disaggregation router 104 is configured to establish a plurality of proxy connections 106 with the at least one carrier network 114, such that the aggregation/disaggregation router 104 aggregates the plurality of proxy connections 106 to provide an aggregated bandwidth local area network connection 122, which can be accessed by a plurality of mobile devices 124;
  wherein the aggregation/disaggregation server 102 is configured to aggregate outbound data from the plurality of proxy connections 106, such that data packets from the same origination mobile device in the plurality of mobile devices can be reassembled and routed to a final destination site 142 via the general internet or wide area network 140; and
  wherein the aggregation/disaggregation server 102 is configured such that inbound data, being returned by the final destination site 142, can be routed through the ADS 102, such that the ADS 102 disaggregates the data, by breaking the data into network packets and distributing the network packets for transport across a plurality of network connections 112 to the at least one carrier network 114, such that each network connection 112 is connected with a proxy connection to the aggregation/disaggregation router 104, such that the aggregation/disaggregation router 104 aggregates the data packets and routes the data packets to the origination mobile device.

In a related embodiment, the at least one carrier network 114 can be comprised of at least two carriers networks 114, comprising a first carrier network 114 and a second carrier network 114, wherein the aggregation/disaggregation router 104 is configured such that the plurality of network connections 112 to the at least one carrier network 114, comprises a first plurality of network connections 112 to the first carrier network 114, and a second plurality of network connections 112 to the second carrier network 114.

Figure 3:
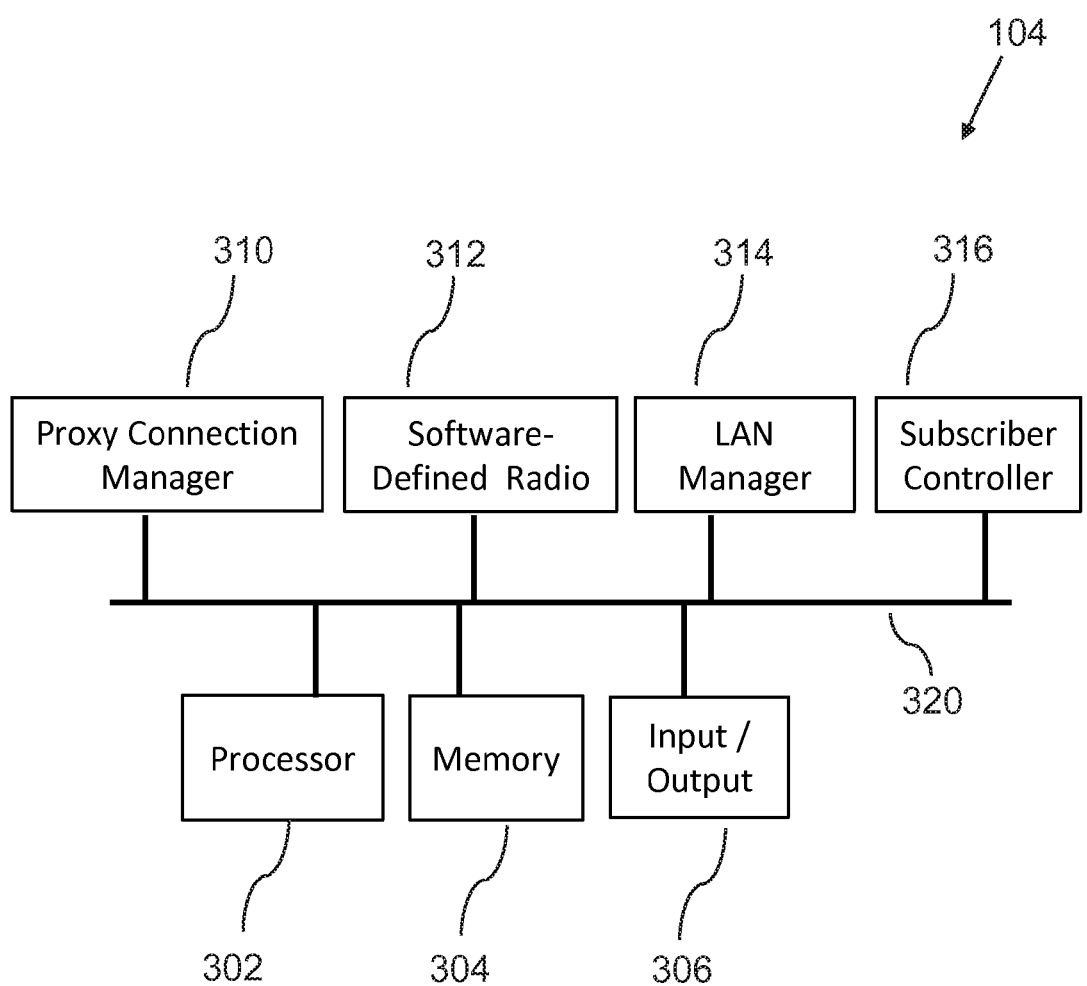
FIG. 3 is a schematic diagram illustrating an aggregation/disaggregation router, according to an embodiment of the invention.

In a related embodiment, as shown in FIG. 3, an aggregation/disaggregation router 104 can include:
  a. A processor 302;
  b. A non-transitory memory 304;
  c. An input/output 306;
  d. A proxy connection manager 310;
  e. A software-defined radio 312;
  f. A local area network manager 314; and
  g. A subscriber controller 316; all connected via
  h. A data bus 320;
  wherein the proxy connection manager 310 is configured to create and control software configurable network access proxies, such that for each network access proxy, the proxy connection manager 310 controls a proxy connection 106 to a carrier network 114 in the at least one carrier network, wherein the proxy connection 106 is a radio connection, established in communication with the software-defined radio 312;
  wherein the local area network manager 314 is configured to create the aggregated bandwidth local area network connection 122 by aggregating bandwidth from the plurality of proxy connections 106;
  wherein the subscriber controller 316 is configured to store subscriber information, including electronic device identifiers and associated available bandwidth subscriptions in the at least one carrier network 114, such that the proxy connection manager 310 can communicate with the subscriber controller 316, to obtain the subscriber information.

Figure 2:
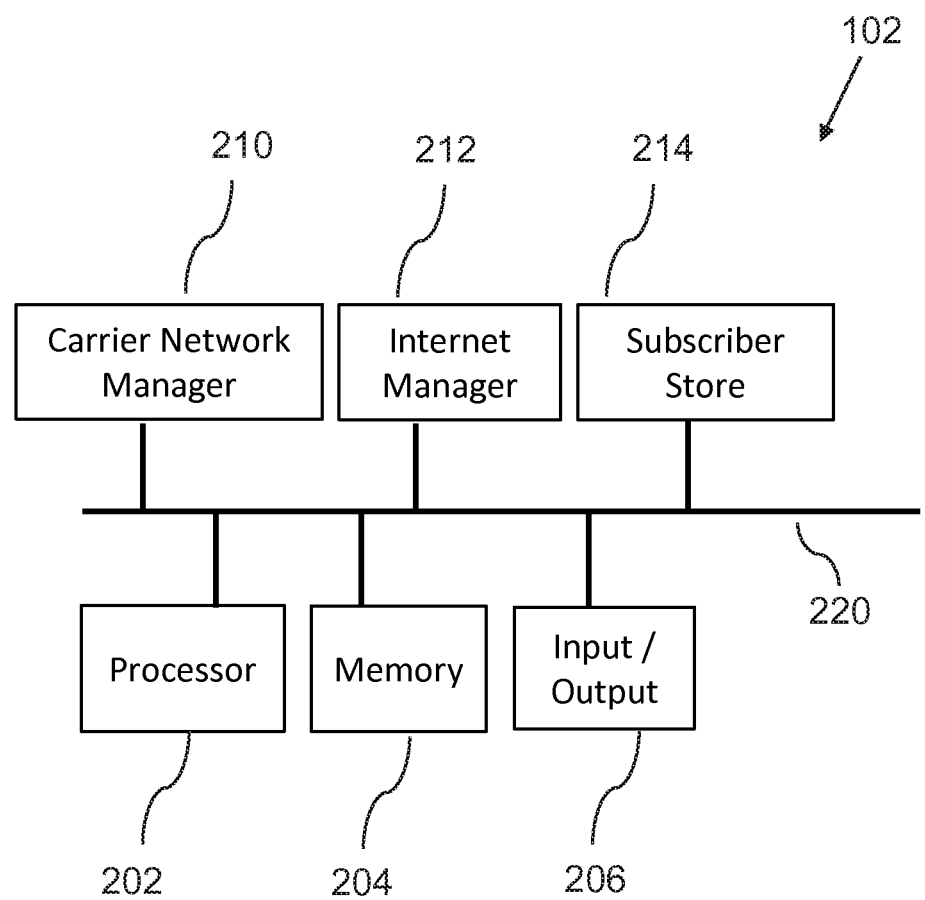
FIG. 2 is a schematic diagram illustrating an aggregation/disaggregation server, according to an embodiment of the invention.

In a related embodiment, as shown in FIG. 2, an aggregation/disaggregation server 102 can be comprised of:
  a. A processor 202;
  b. A non-transitory memory 204;
  c. An input/output component 206;
  d. A carrier network manager 210;
  e. An internet manager 212;
  f. A subscriber store 214; all connected via
  g. A data bus 220;
  wherein the carrier network manager 210 is configured to aggregate the outbound data from the plurality of proxy connections 106, such that the data packets from the origination mobile device 124 in the plurality of mobile devices 124 are reassembled by the carrier network manager 210, which communicates with the internet manager 212, which is configured to route the reassembled data to the final destination site 142 in the general internet 142;
  wherein the carrier network manager 210 is configured such that the inbound data, from the final destination site 142, is received in communication with the internet manager 212, such that the carrier network manager 210 is configured to disaggregate the inbound data, by breaking the inbound data into network packets and distributing the network packets for transport across the plurality of network connections 112 to the at least one carrier network 114, such that each network connection 112 is connected with a proxy connection 106 to the aggregation/disaggregation router 104, wherein the aggregation/disaggregation router 104 is configured to aggregate the data packets and routes the data packets to the origination mobile device 124; and wherein the subscriber store 214 is configured to store subscriber information, including electronic device identifiers and associated available bandwidth subscriptions in the at least one carrier network 114, such that the carrier network manager 210 can communicate with the subscriber store 214, to obtain the subscriber information.

It shall be understood that an executing instance of an embodiment of the system for network aggregation/disaggregation 100, as shown in FIG. 1, can include a plurality of aggregation/disaggregation routers 104, which are each tied to one or more mobile devices 124.

An executing instance of an embodiment of the system for network aggregation/disaggregation 100 can similarly include a plurality of aggregation-/disaggregation servers 102.

In various embodiments, a system for network aggregation/disaggregation 100 creates a broadband network (internet) connection from the aggregation of 1+X user device connections (hardwired or wireless), where the users device connections to be combined can be of the same bandwidth and transmission technologies, or use disparate bandwidth and transmissions technologies. For example: base signals to be used for aggregation can include cellular transmission standards TDMA, CDMA, GSM, 3G, 4G, XG or other types of data packet and modulation techniques and utilizing different transmission frequency ranges.

In related embodiments, regardless of the packet or modulation standard, data rate, or frequency utilization, the signals are aggregated to provide a very high data throughput broadband connection access point that can be used singularly, or shared among registered and unregistered devices. Devices granted access to the new high throughput broadband channel can be, but need not be, those devices providing electronic device identifier signal authorization and sharing.

In a related embodiment, the aggregation/disaggregation router 104 can be configured to create a plurality of proxy connections 106, by authenticating access to the at least one carrier network 114 with a plurality of electronic device identifiers associated with mobile devices that have an available bandwidth subscription on the at least one carrier network 114.

In other related embodiments, the system for network aggregation-/disaggregation 100 aggregates the signals of 1+X registered users who already have approved access to existing network connections that are hardwired or wireless. The system described can accommodate wired or wireless connection methodologies including cellular telephony, LTE, GSM, LAN or WAN WI-FI, hardline dialup, cable, and satellite to name just a few. Signals having various transmission frequencies, modulation techniques, data throughput rates (bandwidth) and signal reception range are aggregated to create a single high throughput broadband point of connection that can be either wireless and/or hardwired. These signal technologies each are characterized by an ability to operate in duplex (i.e. including both transmission and reception) and carry digital information that can be later organized to represent data or voice information. Though the need for carrying these mixed information signals is not essential, carriers can also provide pure data channels or pure voice multiplexed channels through the referenced transmissions without impact to the overall usefulness of the device and system of the inventors. Traffic traveling across the LAN, carrier and network transports utilize native protocols.

In yet other related embodiments, the system for network aggregation/-disaggregation 100 utilizes existing connection channels and techniques and gain access to the provider network's 114 gateway 115 by logging on with an electronic device identifier, which can include an electronic serial number (ESN), IMEI, MED, UIMID, or other electronic identification information, to initiate the access handshake and provide access credentials. These access credentials on confirmation by the provider can provide users various access, including but not limited to, basic rights of access to the system, transactional information for access data rates, data purchased, device connection, and other information as may be needed to gain access.

In yet other related embodiments, the aggregation/disaggregation router 104 can incorporate memory, digital signal processors, computer processors and other electronic devices, either as discrete components within the device, or as virtualized devices on a single or multiple software configurable devices (macro cell processors) proxy devices. Thus, the aggregation/disaggregation router 104 when employed in a virtualized method, whereby the majority of the components are virtualized in software, can allow for greater flexibility and cost reduction/scale by adhering to Network Function Virtualization (NFV) concepts. These proxy devices self-configure for frequency, data rate, modulations technique and for other functions or information setup necessary to replicate and take over the communication functions of 1+X of the registered user devices when that device requests access to connection with the ADR. The device and its configurable processing power for multiplexed communication replication can self-partition allowing for multiple registered users to access or leave the device on the fly. Configuration information is accessed from the registered device or from registered information held in secure storage on the device and referenced by the access device electronic device identifier or other access identification information.

In further related embodiments, total broadband data rate of the aggregation/disaggregation router 104 can be a function of the total aggregated bandwidth available to all connected devices, less system overhead needed to operate the device, manage communication connections, manage actively connected devices, and additional overhead functions as needed for availability from the device.

In further related embodiments, the aggregation/disaggregation router 104 can propagate a broad channel, access point, equal to the net broadband availability across an aggregated channel with high data rate throughput. This aggregated channel can be accessed by local devices utilizing throughput rate of up to the total net broadband availability, or in a fraction of that new bandwidth as each connected device may require below that maximum rate.

In other further related embodiments, the aggregation/disaggregation router 104 can make available a multiplexed broadband data access point that can be connected to by hardwire or wireless connection, and can transport data streams from a single or multiple connected devices, utilizing packet technology to manage IP protocol and traffic across the device and network.

In other further related embodiments, the aggregation/disaggregation router 104 disaggregates received information for transport across the connected carrier and service providers using spread spectrum communication prioritized for data rate optimization. A single or multiple stream(s) of received information can be broken into discrete elements, packet tagged for later reassembly and sent across connections utilizing algorithms tuned for maximum throughput and optimized bandwidth utilization. Packet tracking information can include header information for each packet that allows for the later reassembly of information requests at the network aggregation/disaggregation server(s) 102.

In further related embodiments, data and voice information that has been divided into transport packets can then be assigned to be transmitted to the carrier network associated with one of the devices known to be connected to the ADR 104 and authorized through the electronic device identifier obtained on a registered mobile devices 124 connection to the network. To ensure optimal bandwidth is provided, data and voice can be assigned and transmitted by the device across all active registered mobile device 124 connections 122, creating a multipath connection for all information transport regardless of a single or multiple connected users.

In related embodiments, once transmitted, information can be transported across carrier networks and routed according to standard internet protocol to the aggregation/disaggregation server 102 (ADS), or ADS servers 102, that is the remote transport handler for the aggregation/disaggregation router 104. The ADS 102 is an aggregation/disaggregation and overall routing server that takes packets transmitted from the device to the internet and recombined message streams and final internet site destination before sending the request to its final network destination. The ADS 102 can function as a proxy for all multiplex control of data and voice across the private network/internet and carrier network. Information flowing from the private network/internet to the device and ultimately to registered users of the device is routed through the ADS 102.

In related embodiments, information in the form of data or voice flowing from the private network internet to a local user at the device 124 site is routed to the ADS 102 where it is divided into discrete packets, all properly tagged, and then assigned by the ADS, by means of an optimization algorithm to travel to the device through a selected connected carrier network. Such an optimization can be based on well-known network utilization optimization algorithms, such as combinatorial network optimization or maximum flow optimization, and can further be based on use of Multipath TCP for network routing.

In related embodiments, The ADR 104 provides routine updates to the ADS 102 regarding the addition or deletion of available devices, servers and routing information as that information changes due to registered users connecting or disconnecting to the device.

Figure 4:
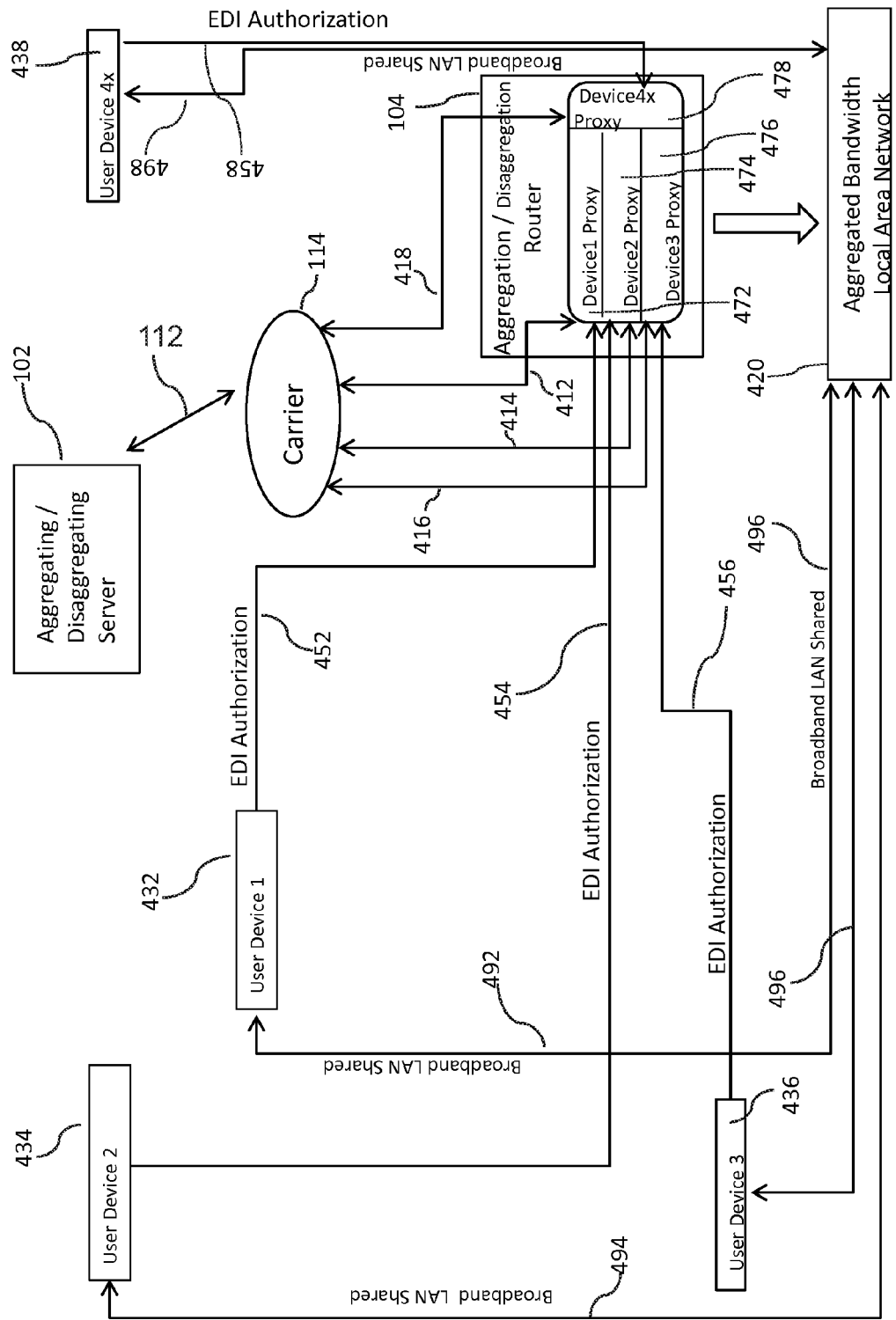
FIG. 4 is a schematic diagram illustrating data flow in the system for network aggregation with multiple user devices connected, according to an embodiment of the invention.

In an embodiment, FIG. 4 shows an overview of the invention where the software configured aggregation/disaggregation router (ADR) 104 is connected to multiple registered user's devices 432 434 436 438 and the Local Area Network Router (LAN) 420.

In a related embodiment, users register their connection with the ADR 104 by accepting to participate in the ADR connection on their device 432 434 436 438 via a hand shake connection 452 454 456 458 to the ADR 104, which for example can authenticate with an electronic device identifier (EDI). Registration provides authorization for the ADR 104 to create a proxy for the user connected device and during registration the ADR 104 user database creates a user file and user device file with the user device file containing information related to the device: carrier or service provider, electronic device identifier or other user authorization number, bandwidth allocation and other data needed to create the ADR proxy.

In a related embodiment, upon a registered user joining the ADR 104 access point the ADR 104 accesses the registered devices electronic device identifier (or other subscriber identification), uses the electronic device identifier to access that registered users file containing device and network provider configuration information such that the proxy connection manager 310 uses that information to load a software configuration of the initial device in a partitioned portion of the software configurable network access proxy 472 474 476 478, controlling a radio connection for each proxy connection via the software-defined radio 312.

In a related embodiment, the proxy connection manager 310 of the aggregation/disaggregation router 104 can be configured to create and control software configurable network access proxies 472 474 476 478.

In a related embodiment, the proxy connection manager 310 can be configured to use Multipath TCP for network routing.

In a related embodiment, the software configurable network access proxy creates a direct connection with the carrier 114 either through hardwired or wireless connection 412 414 416 418 using the connected device access authorization to gain authorized access to the full bandwidth allocated to that device.

In a related embodiment, the local area network manager 314 of the ADR 104 aggregates the bandwidth provided by the connected devices 432 434 436 438 and provides a broadband connection to the LAN 420.

In a related embodiment, the LAN 420 can provide wired or wireless connection for the aggregated broadband network connection to devices authorized to access the LAN 420, either by hardwired or wireless connection 492 494 496 498 and where the devices accessing the LAN 420 may or may not be those devices providing their authorization and network access.

In a related embodiment, all data traveling from the ADR 104 to the network or internet can pass through the network providers and includes a network transport header directing that data to the Aggregation/Disaggregation Server (ADS) 102.

In a related embodiment, for data flowing to the network and a final on network destination the carrier network manager 210 of the ADS 102 can reassemble data packets and route that data to the final destination network site specified by the data or request originator connected to the LAN 420.

In a related embodiment, data being returned by a network destination site can be routed through the ADS 102, such that the carrier network manager 210 breaks the data into packets and distributes those packets for transport across connected carriers by means of an optimization algorithm. In a related embodiment, the carrier network manager 210 can be configured to use Multipath TCP for network routing.

In a related embodiment, data received from the carrier connection 412 414 416 418 is reassembled and transported to the LAN 420 for delivery to the appropriate user device 432 434 436 438 across wired or wireless connections 492 494 496 498.

Figure 5:
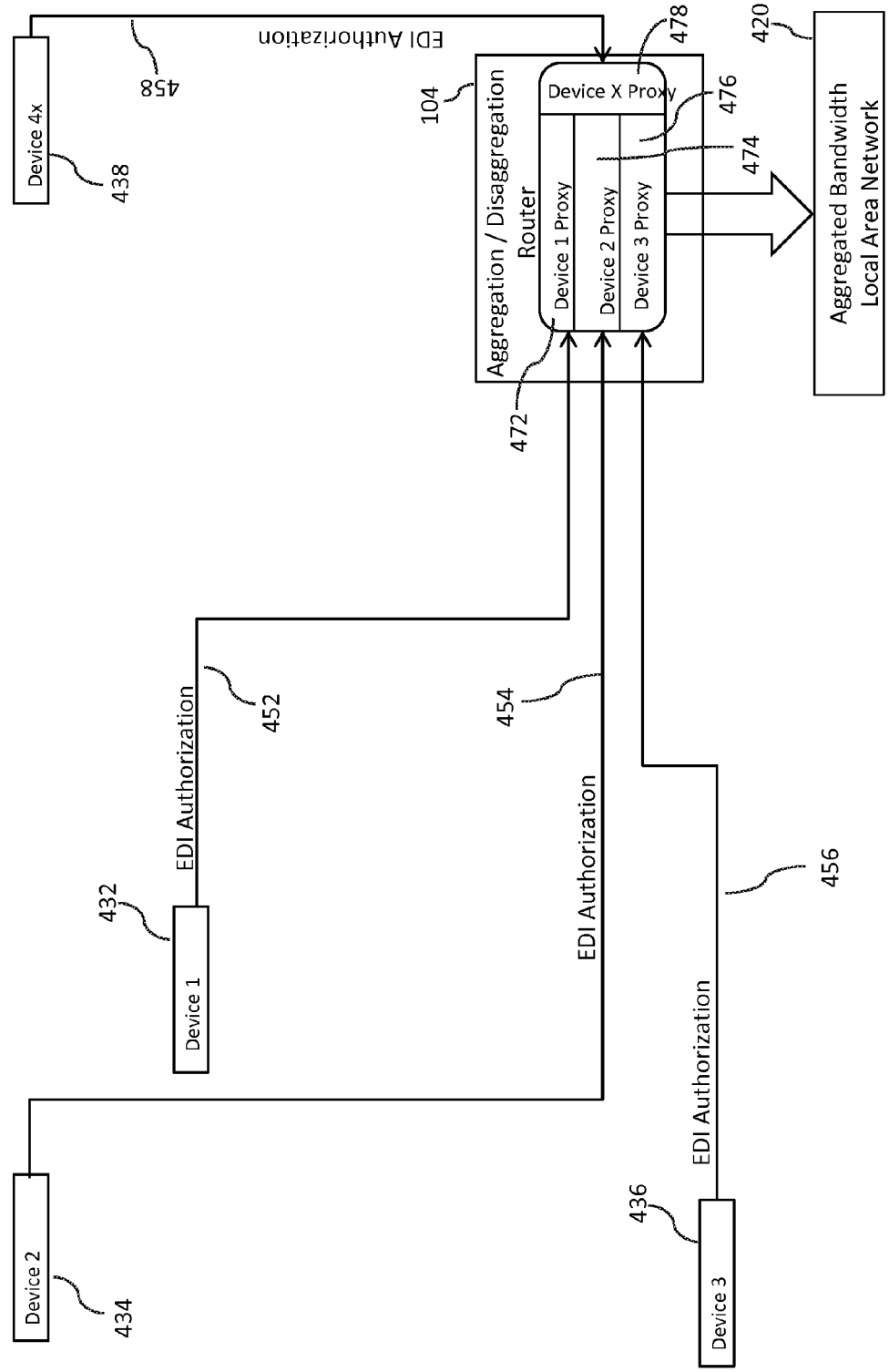
FIG. 5 is a schematic diagram illustrating data flow for identification authorization acquisition, according to an embodiment of the invention.

In an embodiment, as shown in FIG. 5, the electronic device identifier (or other authorization identifiers) are referenced by the proxy connection manager 310 of the ADR 104 to acquire carrier and device configuration information and to instantiate the software configured/software determined radio/or software determined access ports, controlled by the software-defined radio 312, making up the proxy connections 472 474 476 478 for the ADR 104.

In a related embodiment, the local area network manager 314 of the ADR 104 communicates with connected devices via Bluetooth or wireless or hardwired protocol utilizing the electronic device identifier from each device for system authentication and access to allocated bandwidth In a related embodiment, the proxy connection manager 310 can be configured to manage proxy connections 472 474 476 478 of the ADR 104 as software configured access points, including software defined radios that are instantiated by the software-defined radio 312, according to the registered information of each device as it is connected to the system 100. The ADR connects or disconnects a device and utilizes that devices Bandwidth via proxy by confirm the presence of the device.

In a related embodiment, the proxy connections 472 474 476 478 controlled by the proxy connection manager 310 of the ADR 104 assume the network communications functions from the connected devices using the presence of the registration connection to create a proxy device with the cell.

In a related embodiment, the proxy connections 472 474 476 478 controlled by the proxy connection manager 310 of the ADR 104 can be configured on the fly for hardwire transport, or wireless transport including software defined radio configuration for cellular telephony across existing or future modulation standards, frequency transmission, data rate throughput In a related embodiment, the proxy connection manager 310 in communication with the local area network manager 314 can utilize multipath switching router logic to create a multiplexed broadband connection point for the LAN 420 where the LAN 420 can then connect with the same or other devices via hardwired or wireless ports using standard TCP/IP protocol.

Figure 6:
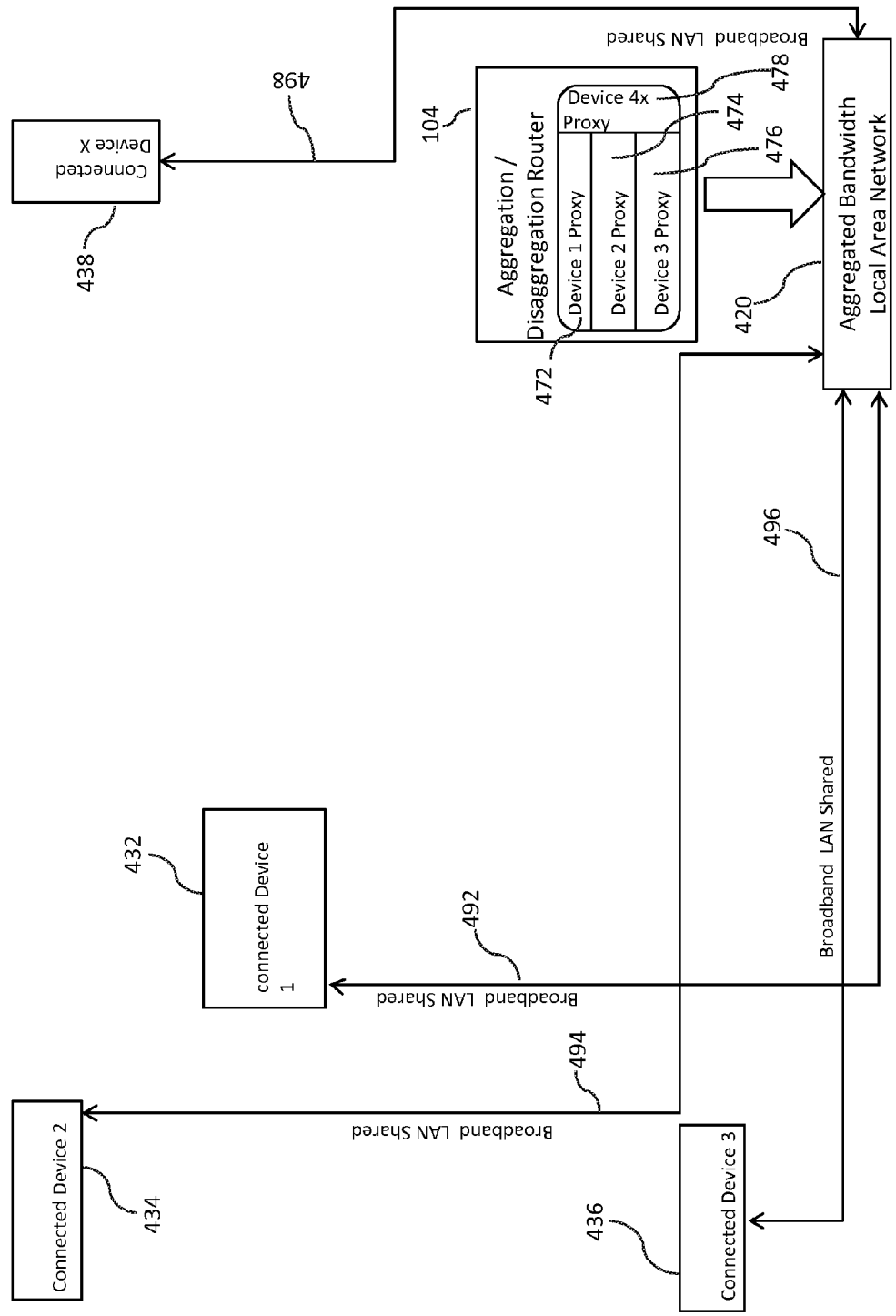
FIG. 6 is a schematic diagram illustrating data flow for utilizing aggregated bandwidth, according to an embodiment of the invention.

In an embodiment, as shown in FIG. 6, the invention utilizes the aggregated bandwidth broadband connection, for network access through the LAN 420 and ADR 104.

Connected devices 432 434 436 438 can be either hardwired or wireless connections 492 494 496 498 and the devices 432 434 436 438 can be those devices of registered connected users or other approved additional devices not sharing a carrier connection, but accessing the LAN 420 connection.

In a related embodiment, the ADR 104 can manage multiplex traffic from devices 432 434 436 438 to carrier and network destinations and from network destinations and carriers to appropriate devices In a related embodiment, the ADR 104 aggregates and disaggregates data packets for multiplexed data transport.

Figure 7:
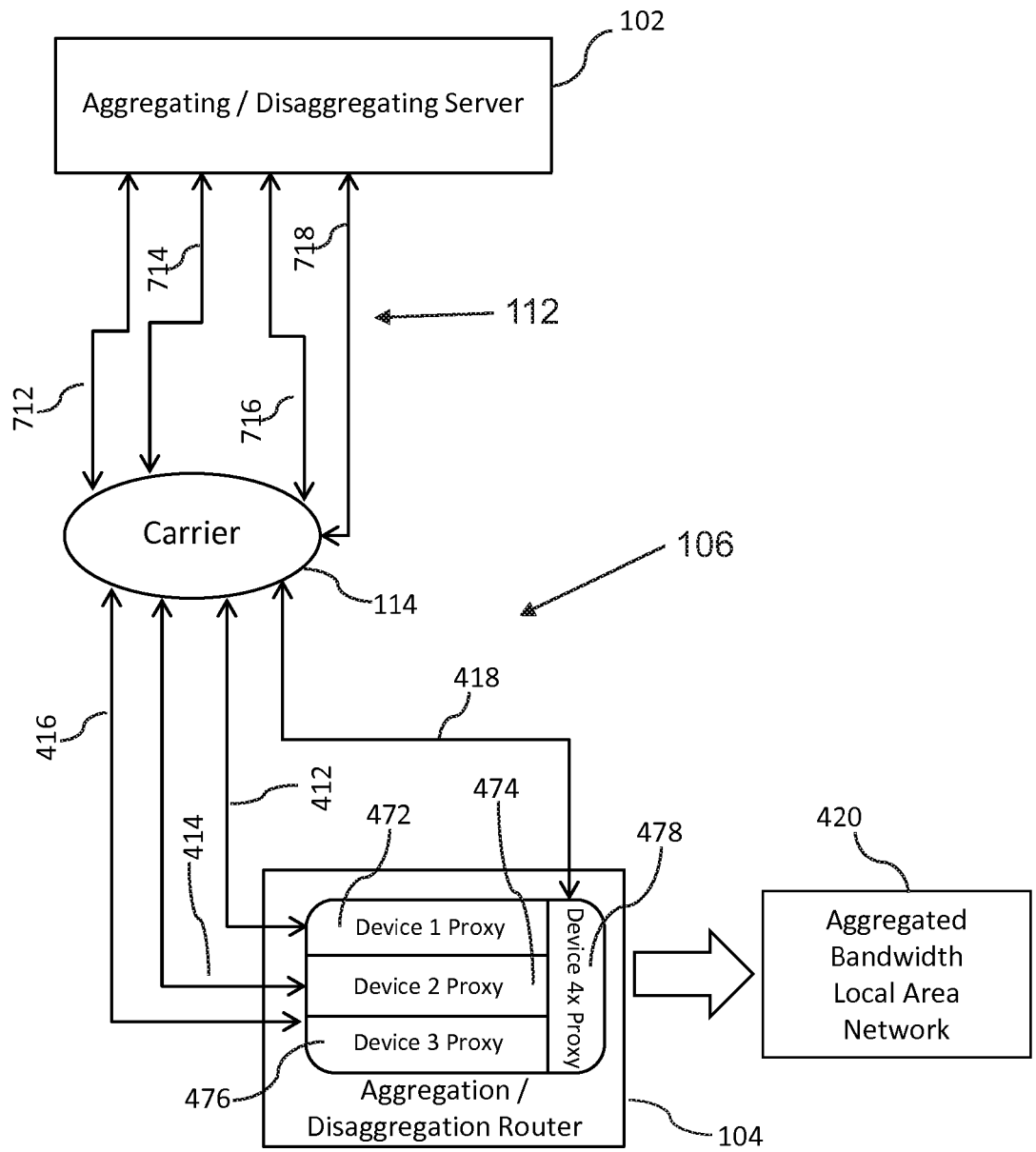
FIG. 7 is a schematic diagram illustrating data flow for multiplexed connectivity to a remote network, according to an embodiment of the invention.

In a related embodiment, as shown in FIG. 7, the local area network manager can be configured to control multiplexed connectivity via the LAN 420, such that data is transported through the proxy connection manager 310 of the ADR 104 to carrier network connections 412 414 416 418 to the carrier network 114, then via carrier network connections 712 714 716 716, to the carrier network manager 210 of the aggregation/disaggregation server (ADS) 102 for processing, via the internet manager 212, to final network destination or for assignment to carrier connection for transport to connected users devices through the ADR 104 and LAN 420.

In a related embodiment, the proxy connection manager 310 can be configured to use Multipath TCP for network routing.

In a related embodiment, the proxy connection manager 310 of the ADS 102 and the carrier network manager 210 of the ADR 104 use multipath logic to aggregate and disaggregate data packets for optimal transport across all connection points 412 414 416 418 and to ensure transport packets arrive at the proper user or network site destinations. The transport algorithm logic uses a spread spectrum configuration optimized to ensure faster data rates.

In a further related embodiment, the proxy connection manager 310 and the carrier network manager 210 can be configured to use Multipath TCP for network routing.

In a further related embodiment, the proxy connection manager 310 can be further configured to use Multipath TCP for network routing over the plurality of proxy connections 106.

In a further related embodiment, the carrier network manager 210 can be further configured to use Multipath TCP for network routing over the plurality of network connections 112.

In a related embodiment, the LAN 420 can be accessed via a freestanding router or a router can be incorporated into the logic of the local area network manager 314 of the ADR 104.

In a related embodiment, the software defined radio enabled configuration of the ADR 104 and additional software configurable aspects of the ADR 104 allow for wired and wireless network connections and carriers to be aggregated and disaggregated to create a seamless broadband network connection without the need for carriers to implement any additional functions or changes to their existing network infrastructure. Data flowing across the network to final destination or to users' devices can utilize TCP/IP standards.

Figure 8:
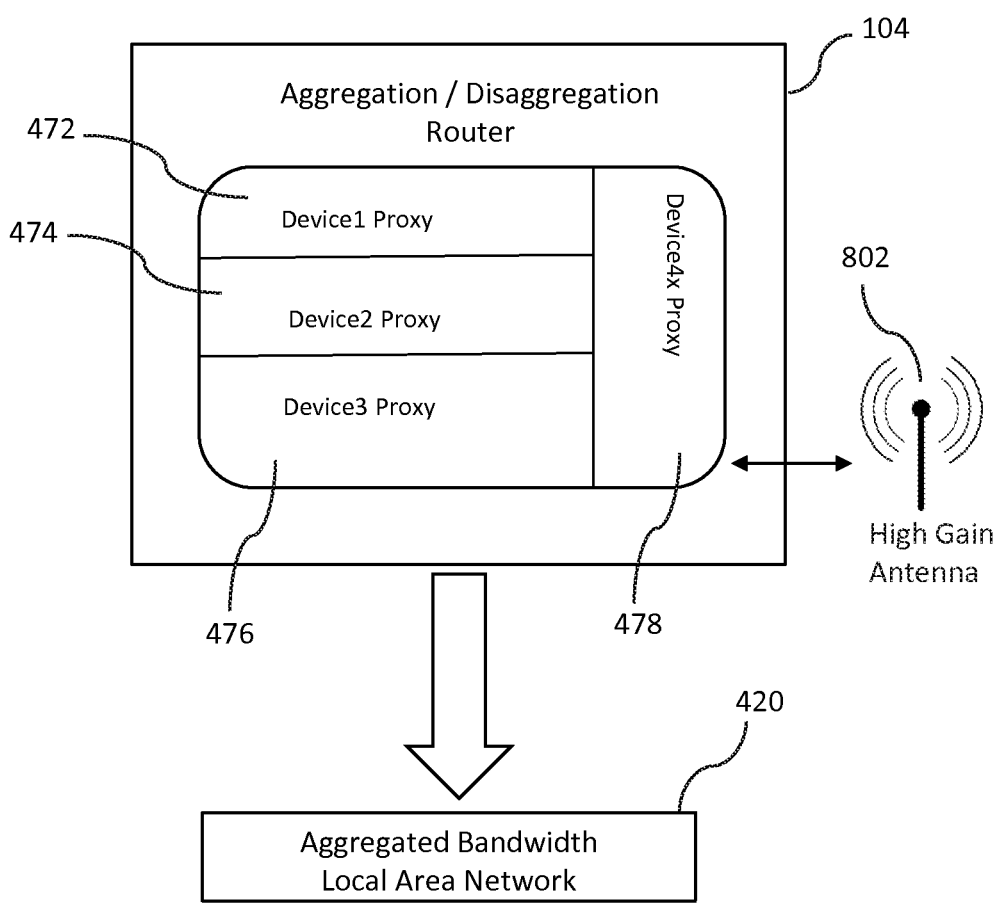
FIG. 8 is a schematic diagram illustrating an aggregation/disaggregation router with software configurable proxy device cells, according to an embodiment of the invention.

In an embodiment, as shown in FIG. 8, the aggregation/disaggregation router 104 with its software configurable proxy device connections 1 to X 472 474 476 478, internal or external Local Area Network Device LAN 420 and connection to a high gain antenna 802 for cellular or other wireless communication.

In a related embodiment, the ADR 104 is a software configurable multichannel device that can be made up of 1+X wireless, wired or mixed wired and wireless channels for connection to a carrier data network 114.

In a related embodiment, the ADR 104 proxy connection manager 310 can configure each proxy device 472 474 476 478 to operate as a software determined radio, or other wireless or hardwire connection, via the software-defined radio 312.

In a related embodiment, local area network manager 314 of the ADR 104 can be configured to create a broadband network (internet) connection from the aggregation of 1+X connections (wired or wireless) where the each carrier or service provider connection to be combined can be of the same bandwidth and transmission technologies or of disparate bandwidth and transmissions technologies.

In a related embodiment, ADR 104 base signal connections, established by software-defined radio 312, under control of the proxy connection manager 310, to be used for aggregation may be of transmission standards consistent for TDMA, CDMA, GSM, 3G, 4G, XG, or other types of data transport schemes and modulation techniques, according to existing or future standards or proprietary methods, and utilizing different transmission frequency ranges data rates, or other communications data and voice transport standards.

In a related embodiment, the proxy connection manager 310 can be configured such that plurality of proxy connections with at least one carrier network, are configured with a plurality of cellular transmission standards, which are each selected from the group consisting of TDMA, CDMA, GSM, 3G, 4G, LTE, and combinations thereof.

In a related embodiment, regardless of modulation standard, data rate, or frequency utilization the carrier and service provider connections signals are aggregated to provide a single frequency, very high data throughput Broadband wireless communication TCP/IP access point that can be used singularly, or shared among registered and connected and non-registered and connected wireless and hardwired devices.

In a related embodiment, operating entirely or in part to create device proxy for wireless carrier connections the ADR 104 software-defined radio 312 can be connected to a high gain antenna 802 to maximize the signal strength, reception transmission quality and optimal data rate/data throughput.

Figure 9:
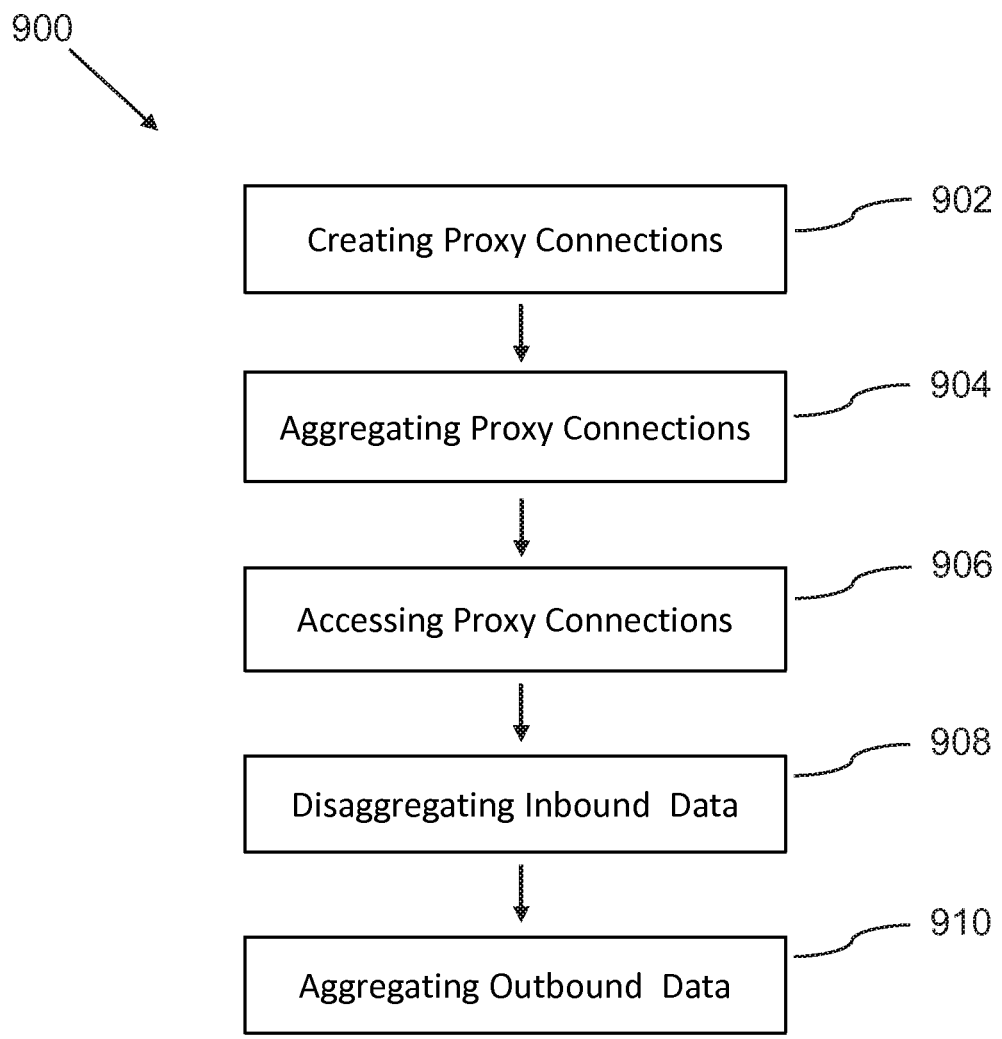
FIG. 9 is a flowchart illustrating steps that may be followed, in accordance with one embodiment of a method or process of network aggregation/disaggregation, according to an embodiment of the invention.

In an embodiment, as illustrated in FIG. 9, a method of network aggregation/disaggregation 900, can include:
 a. Creating proxy connections 902, wherein a plurality of proxy connections 106, which are connected with at least one carrier network 114, are created by an aggregation/disaggregation router 104;
 b. Aggregating proxy connections 904, wherein the aggregation/disaggregation router 104 aggregates the plurality of proxy connections 106 to provide an aggregated bandwidth local area network connection 122;
 c. Accessing proxy connections 906, wherein the aggregated bandwidth local area network connection is accessed by a plurality of mobile devices 124;
 d. Disaggregating inbound network data 908, wherein an aggregation/disaggregation server 102 disaggregates the inbound network data, by breaking the data into network packets and distributing the network packets for transport across a plurality of network connections 112 to the at least one carrier network 114, such that each network connection 112 is connected with a proxy connection to the aggregation/disaggregation router 104, such that the aggregation/disaggregation router 104 aggregates the data packets and routes the data packets to the origination mobile device.
 e. Aggregating outbound network data 910, wherein the aggregation/disaggregation server 102 aggregates outbound data from the plurality of proxy connections 106, such that data packets from an origination mobile device 124 in the plurality of mobile devices are reassembled and routed via a network 140 to final destination website 142 in the general internet or wide area network.

In a related embodiment, the ADR 104 can be implemented as a software configurable processor and circuit array housing all functional and configurable parts of the device. Equally, the ADR 104 can be realized by some combination of discrete parts including, but not limited to, multiple processors, digital to analog converters, internally housed antenna and other discrete additional parts that can be configured to provide multiple wireless and wired access points in proxy to connected devices.

In a related embodiment, the system, methodology and devices described in this detailed description and embodiment of the invention is one of a number of means that the invention may be realized across private networks, the internet, by carrier and service providers and utilizing other communication and data transport techniques.

In various embodiments, a device and system can provide the means and methodology to manage and repurpose multiple carrier and access providers network access and connectivity and to repurpose allocated bandwidth to provide broader band network and internet access using existing carrier connection, transmission, IP protocol, and other communications technologies: the device and system provides the Aggregation and Disaggregation of authorized carrier Bandwidth using the Electronic Serial Number or other Access Authorization Identifier for registered user devices to create a software configured proxy and to aggregate and disaggregate available bandwidth for network and internet access. The device manages and provides connectivity for Multiple User Devices from Various Manufacturers utilizing Multiple Demodulation Standards/Multiple Packet transfer protocol/and Multiple Voice and Data Rates by creating proxy devices that are software configurable and that can create Software Defined Radio and hardwired connection protocols and procedures within a Software configurable processor incorporating multipath aggregation and disaggregation control software for the combination of multiple carrier and service provider voice and data signals to create multiplex Broadband High throughput data connection with hardwire or wireless local transport and connectivity: the self-configurable processor is configured to match authorized connected devices of registered users so that users devices can join or exit the aggregated Bandwidth at will with processor control software that updates the users connected, available bandwidth and carrier connection information continuously to provide uninterrupted data flow across the LAN aggregated connection and the service provider/carrier disaggregation connections. Connection access authorization is obtained by means of creating a proxy access point through bonding with a user device Electronic Serial Number (or other electronic access identifier) coupled to the processor by means of a Bluetooth or other secondary wireless connection or by hardwired connection.

FIGS. 1-9 are block diagrams and flowcharts, methods, devices, systems, apparatuses, and computer program products according to various embodiments of the present invention. It shall be understood that each block or step of the block diagram, flowchart and control flow illustrations, and combinations of blocks in the block diagram, flowchart and control flow illustrations, can be implemented by computer program instructions or other means. Although computer program instructions are discussed, an apparatus or system according to the present invention can include other means, such as hardware or some combination of hardware and software, including one or more processors or controllers, for performing the disclosed functions.

In this regard, FIGS. 1-8 depict the computer devices of various embodiments, each containing several of the key components of a general-purpose computer by which an embodiment of the present invention may be implemented. Those of ordinary skill in the art will appreciate that a computer can include many components. However, it is not necessary that all of these generally conventional components be shown in order to disclose an illustrative embodiment for practicing the invention. The general-purpose computer can include a processing unit and a system memory, which may include various forms of non-transitory storage media such as random access memory (RAM) and read-only memory (ROM). The computer also may include nonvolatile storage memory, such as a hard disk drive, where additional data can be stored.

FIG. 1 shows a depiction of an embodiment of the system for network aggregation/disaggregation 100, including the aggregation/disaggregation server 102, and the aggregation/disaggregation router 104. In this relation, a server shall be understood to represent a general computing capability that can be physically manifested as one, two, or a plurality of individual physical computing devices, located at one or several physical locations. A server can for example be manifested as a shared computational use of one single desktop computer, a dedicated server, a cluster of rack-mounted physical servers, a datacenter, or network of datacenters, each such datacenter containing a plurality of physical servers, or a computing cloud, such as Amazon EC2 or Microsoft Azure.

It shall be understood that the above-mentioned components of the aggregation/disaggregation server 102 and the aggregation/disaggregation router 104 are to be interpreted in the most general manner.

For example, the processors 202 302, can each respectively include a single physical microprocessor or microcontroller, a cluster of processors, a datacenter or a cluster of datacenters, a computing cloud service, and the like.

In a further example, the non-transitory memory 204 and the non-transitory memory 304 can each respectively include various forms of non-transitory storage media, including random access memory and other forms of dynamic storage, and hard disks, hard disk clusters, cloud storage services, and other forms of long-term storage. Similarly, the input/output 206 and the input/output 306 can each respectively include a plurality of well-known input/output devices, such as screens, keyboards, pointing devices, motion trackers, communication ports, and so forth.

Furthermore, it shall be understood that the aggregation/disaggregation server 102 and the aggregation/disaggregation router 104 can each respectively include a number of other components that are well known in the art of general computer devices, and therefore shall not be further described herein. This can include system access to common functions and hardware, such as for example via operating system layers such as Windows, Linux, and similar operating system software, but can also include configurations wherein application services are executing directly on server hardware or via a hardware abstraction layer other than a complete operating system.

An embodiment of the present invention can also include one or more input or output components, such as a mouse, keyboard, monitor, and the like. A display can be provided for viewing text and graphical data, as well as a user interface to allow a user to request specific operations. Furthermore, an embodiment of the present invention may be connected to one or more remote computers via a network interface. The connection may be over a local area network (LAN) wide area network (WAN), and can include all of the necessary circuitry for such a connection.

In a related embodiment, the aggregation/disaggregation server 102 communicates with a website 142 over a network 140, which can include the general Internet, a Wide Area Network, a Local Area Network, a private communication cloud, a private internet, a hybrid private internet, or another form of communication network, transmitted on wired or wireless connections. Wireless networks can for example include Wi-Fi, Bluetooth, ZigBee, and NFC. The communication can be transferred via a secure, encrypted communication protocol.

In a related embodiment, the aggregation/disaggregation server 102 communicates with the carrier data network 102 over a network 112, which can include the general Internet, a Wide Area Network or a Local Area Network, a private communication cloud, a private internet, a hybrid private internet, or another form of communication network, transmitted on wired or wireless connections. Wireless networks can for example include Wi-Fi, Bluetooth, ZigBee, and NFC. The communication can be transferred via a secure, encrypted communication protocol.

In a related embodiment, the aggregation/disaggregation router 104 communicates with the mobile devices 124 over a network 122, which can include the general Internet, a Wide Area Network or a Local Area Network, a private communication cloud, a private internet, a hybrid private internet, or another form of communication network, transmitted on wired or wireless connections. Wireless networks can for example include Wi-Fi, Bluetooth, ZigBee, and NFC. The communication can be transferred via a secure, encrypted communication protocol.

Typically, computer program instructions may be loaded onto the computer or other general-purpose programmable machine to produce a specialized machine, such that the instructions that execute on the computer or other programmable machine create means for implementing the functions specified in the block diagrams, schematic diagrams or flowcharts. Such computer program instructions may also be stored in a computer-readable medium that when loaded into a computer or other programmable machine can direct the machine to function in a particular manner, such that the instructions stored in the computer-readable medium produce an article of manufacture including instruction means that implement the function specified in the block diagrams, schematic diagrams or flowcharts.

In addition, the computer program instructions may be loaded into a computer or other programmable machine to cause a series of operational steps to be performed by the computer or other programmable machine to produce a computer-implemented process, such that the instructions that execute on the computer or other programmable machine provide steps for implementing the functions specified in the block diagram, schematic diagram, flowchart block or step.

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagrams, schematic diagrams or flowcharts, as well as combinations of blocks or steps, can be implemented by special purpose hardware-based computer systems, or combinations of special purpose hardware and computer instructions, that perform the specified functions or steps.

As an example, provided for purposes of illustration only, a data input software tool of a search engine application can be a representative means for receiving a query including one or more search terms. Similar software tools of applications, or implementations of embodiments of the present invention, can be means for performing the specified functions. For example, an embodiment of the present invention may include computer software for interfacing a processing element with a user-controlled input device, such as a mouse, keyboard, touch screen display, scanner, or the like. Similarly, an output of an embodiment of the present invention may include, for example, a combination of display software, video card hardware, and display hardware. A processing element may include, for example, a controller or microprocessor, such as a central processing unit (CPU), arithmetic logic unit (ALU), or control unit.

Here has thus been described a multitude of embodiments of the system for network aggregation/disaggregation 100, along with devices, and methods related thereto, which can be employed in numerous modes of usage.

The many features and advantages of the invention are apparent from the detailed specification, and thus, it is intended by the appended claims to cover all such features and advantages of the invention, which fall within the true spirit and scope of the invention.

For example, alternative embodiments can reconfigure or combine the components of the aggregation/disaggregation server 102, and the aggregation/-disaggregation router 104. The components of the aggregation/disaggregation server 102 can be distributed over a plurality of physical, logical, or virtual servers. Parts or all of the components of the aggregation/disaggregation router 104 can be configured to operate in aggregation/disaggregation server 102, whereby the aggregation/disaggregation router 104 for example can function as a thin client, performing only graphical user interface presentation and input/output functions. Alternatively, parts or all of the components of the aggregation/disaggregation server 102 can be configured to operate in the aggregation/disaggregation router 104.

Many such alternative configurations are readily apparent, and should be considered fully included in this specification and the claims appended hereto. Accordingly, since numerous modifications and variations will readily occur to those skilled in the art, it is not desired to limit the invention to the exact construction and operation illustrated and described, and thus, all suitable modifications and equivalents may be resorted to, falling within the scope of the invention.

What is claimed is:

1. A system for network aggregation/disaggregation, comprising:
    an aggregation/disaggregation router;
    at least one carrier network; and
    an aggregation/disaggregation server, comprising;
        a processor;
        a non-transitory memory;
        an input/output component;
        a carrier network manager; and
        an internet manager; all connected via
        a data bus;
    wherein the aggregation/disaggregation router is configured to establish a plurality of proxy connections with the at least one carrier network, such that the aggregation/disaggregation router aggregates the plurality of proxy connections, to provide an aggregated bandwidth local area network connection, which is accessed by a plurality of mobile devices;
    wherein the aggregation/disaggregation server is configured to aggregate outbound data from the plurality of proxy connections, such that data packets from an origination mobile device in the plurality of mobile devices are reassembled by the aggregation/disaggregation server, which routes the reassembled data to a final destination site; and
    wherein the aggregation/disaggregation server is configured such that inbound data, from the final destination site, is routed through the aggregation/disaggregation server, such that the aggregation/disaggregation server disaggregates the inbound data, by breaking the inbound data into network packets and distributing the network packets for transport across a plurality of network connections to the at least one carrier network, such that each network connection is connected with a proxy connection to the aggregation/disaggregation router, such that the aggregation/disaggregation router aggregates the data packets and routes the data packets to the origination mobile device;
    wherein the carrier network manager is configured to aggregate the outbound data from the plurality of proxy connections, such that the data packets from the origination mobile device in the plurality of mobile devices are reassembled by the carrier network manager, which communicates with the internet manager, which is configured to route the reassembled data to the final destination site; and
    wherein the carrier network manager is configured such that the inbound data, from the final destination site, is received in communication with the internet manager, such that the carrier network manager is configured to disaggregate the inbound data, by breaking the inbound data into the network packets and distributing the network packets for transport across the plurality of network connections to the at least one carrier network, such that each network connection is connected with a proxy connection to the aggregation/disaggregation router, wherein the aggregation/disaggregation router is configured to aggregate the data packets and route the data packets to the origination mobile device.

2. The system for network aggregation/disaggregation of claim 1, wherein the aggregation/disaggregation router is further configured such that the plurality of network connections to the at least one carrier network comprises a first plurality of network connections to a first carrier network, and a second plurality of network connections to a second carrier network, wherein the at least one carrier network comprises at least two carriers networks, comprising the first carrier network and the second carrier network.

3. The system for network aggregation/disaggregation of claim 1, wherein the aggregation/disaggregation router is further configured such that the plurality of proxy connections with the at least one carrier network, are configured with a plurality of cellular transmission standards, which are each selected from the group consisting of time division multiple access, code division multiple access, global system for mobile communications, third generation wireless communications, fourth generation wireless communications, long-term evolution , and combinations thereof.

4. The system for network aggregation/disaggregation of claim 1, wherein the aggregation/disaggregation router is further configured to create the plurality of proxy connections, by authenticating access to the at least one carrier network with a plurality of electronic device identifiers associated with mobile devices that have an available bandwidth subscription on the at least one carrier network.

5. The system for network aggregation/disaggregation of claim 1, wherein the aggregation/disaggregation router further comprises:
    a processor;
    a non-transitory memory;
    an input/output component;
    a proxy connection manager;
    a software-defined radio; and
    a local area network manager; all connected via
    a data bus;
    wherein the proxy connection manager is configured to create and control software configurable network access proxies, such that for each network access proxy, the proxy connection manager controls a proxy connection to a carrier network in the at least one carrier network, wherein the proxy connection is a radio connection, established in communication with the software-defined radio;
    wherein the local area network manager is configured to create the aggregated bandwidth local area network connection by aggregating bandwidth from the plurality of proxy connections.

6. The system for network aggregation/disaggregation of claim 5, wherein the proxy connection manager is further configured to use multipath transmission control protocol for network routing over the plurality of proxy connections.

7. The system for network aggregation/disaggregation of claim 1, wherein the carrier network manager is further configured to use multipath transmission control protocol for network routing over the plurality of network connections.

8. The system for network aggregation/disaggregation of claim 1, wherein the aggregation/disaggregation router further comprises:
a processor;
a non-transitory memory;
an input/output component;
a proxy connection manager;
a software-defined radio; and
a local area network manager; all connected via
a data bus;
wherein the proxy connection manager is configured to create and control software configurable network access proxies, such that for each network access proxy, the proxy connection manager controls a proxy connection to a carrier network in the at least one carrier network, wherein the proxy connection is a radio connection, established in communication with the software-defined radio;
wherein the local area network manager is configured to create the aggregated bandwidth local area network connection by aggregating bandwidth from the plurality of proxy connections.

9. An aggregation/disaggregation router, comprising:
a processor;
a non-transitory memory;
an input/output component;
a proxy connection manager;
a subscriber controller;
a software-defined radio; and
a local area network manager; all connected via
a data bus;
wherein the proxy connection manager is configured to create and control software configurable network access proxies, such that for each network access proxy, the proxy connection manager controls a proxy connection to a carrier network in at least one carrier network, wherein the proxy connection is a radio connection, established in communication with the software-defined radio;
wherein the local area network manager is configured to create an aggregated bandwidth local area network connection by aggregating bandwidth from a plurality of proxy connections;
wherein the subscriber controller is configured to store subscriber information, including electronic device identifiers and associated available bandwidth subscriptions in the at least one carrier network, such that the proxy connection manager communicates with the subscriber controller, to obtain the subscriber information.

10. The aggregation/disaggregation router of claim 9, wherein the proxy connection manager is further configured such that the plurality of network connections to the at least one carrier network comprises a first plurality of network connections to a first carrier network, and a second plurality of network connections to a second carrier network, wherein the at least one carrier network comprises at least two carriers networks, comprising the first carrier network and the second carrier network.

11. The aggregation/disaggregation router of claim 9, wherein the proxy connection manager is further configured such that the plurality of proxy connections with the at least one carrier network, are configured with a plurality of cellular transmission standards, which are each selected from the group consisting of time division multiple access, code division multiple access, global system for mobile communications, third generation wireless communications, fourth generation wireless communications, long-term evolution , and combinations thereof.

12. The aggregation/disaggregation router of claim 9, wherein the aggregation/disaggregation router is further configured to create the plurality of proxy connections, by authenticating access to the at least one carrier network with a plurality of electronic device identifiers associated with mobile devices that have an available bandwidth subscription on the at least one carrier network.

13. A method for network aggregation/disaggregation, comprising:
creating proxy connections, wherein a plurality of proxy connections are created by an aggregation/disaggregation router, wherein the plurality of proxy connections are connected with at least one carrier network, wherein the plurality of proxy connections are wireless connections;
aggregating proxy connections, wherein the aggregation/disaggregation router aggregates the plurality of proxy connections to provide an aggregated bandwidth local area network connection;
accessing proxy connections, wherein the aggregated bandwidth local area network connection is accessed by a plurality of mobile devices;
disaggregating inbound network data, wherein an aggregation/disaggregation server disaggregates the inbound network data, by breaking the data into network packets and distributing the network packets for transport across a plurality of network connections to the at least one carrier network, such that each network connection is connected with a proxy connection to the aggregation/disaggregation router, such that the aggregation/disaggregation router aggregates the data packets and routes the data packets to the origination mobile device; and
aggregating outbound network data, wherein the aggregation/disaggregation server aggregates outbound data from the plurality of proxy connections, such that data packets from an origination mobile device in the plurality of mobile devices are reassembled and routed to a final destination site;
wherein the aggregation/disaggregation router is configured to use multipath transmission control protocol for network routing over the plurality of proxy connections.

14. The method for network aggregation/disaggregation of claim 13, wherein the at least one carrier network comprises at least two wireless carrier networks, comprising a first wireless carrier network and a second wireless carrier network, such that the plurality of network connections to the at least one carrier network comprises a first plurality of network connections to the first wireless carrier network, and a second plurality of network connections to the second wireless carrier network.

15. The method for network aggregation/disaggregation of claim 13, wherein the proxy connection with the at least one carrier network is configured with a cellular transmission standard, which is selected from the group consisting of time division multiple access, code division multiple access, global system for mobile communications, third generation wireless communications, fourth generation wireless communications, long-term evolution, and combinations thereof.

16. The method for network aggregation/disaggregation of claim 13, wherein the aggregation/disaggregation router authenticates access to the at least one carrier network with a plurality of electronic device identifiers associated with mobile devices that have an available bandwidth subscription on the at least one carrier network.

17. A system for network aggregation/disaggregation, comprising:
an aggregation/disaggregation router;
at least one carrier network; and
an aggregation/disaggregation server;
wherein the at least one carrier network is wireless;
wherein the aggregation/disaggregation router is configured to establish a plurality of proxy connections with the at least one carrier network, such that the aggregation/disaggregation router aggregates the plurality of proxy connections, to provide an aggregated bandwidth local area network connection, which is accessed by a plurality of mobile devices;
wherein the aggregation/disaggregation server is configured to aggregate outbound data from the plurality of proxy connections, such that data packets from an origination mobile device in the plurality of mobile devices are reassembled by the aggregation/disaggregation server, which routes the reassembled data to a final destination site; and
wherein the aggregation/disaggregation server is configured such that inbound data, from the final destination site, is routed through the aggregation/disaggregation server, such that the aggregation/disaggregation server disaggregates the inbound data, by breaking the inbound data into network packets and distributing the network packets for transport across a plurality of network connections to the at least one carrier network, such that each network connection is connected with a proxy connection to the aggregation/disaggregation router, such that the aggregation/disaggregation router aggregates the data packets and routes the data packets to the origination mobile device;
wherein the aggregation/disaggregation router is further configured to use multipath transmission control protocol for network routing over the plurality of proxy connections.

18. The system for network aggregation/disaggregation of claim 17, wherein the aggregation/disaggregation router is further configured such that the plurality of network connections to the at least one carrier network comprises a first plurality of network connections to a first carrier network, and a second plurality of network connections to a second carrier network, wherein the at least one carrier network comprises at least two carriers networks, comprising the first carrier network and the second carrier network.

19. The system for network aggregation/disaggregation of claim 17, wherein the aggregation/disaggregation router is further configured such that the plurality of proxy connections with the at least one carrier network, are configured with a plurality of cellular transmission standards, which are each selected from the group consisting of time division multiple access, code division multiple access, global system for mobile communications, third generation wireless communications, fourth generation wireless communications, long-term evolution , and combinations thereof.

20. The system for network aggregation/disaggregation of claim 17, wherein the aggregation/disaggregation router is further configured to create the plurality of proxy connections, by authenticating access to the at least one carrier network with a plurality of electronic device identifiers associated with mobile devices that have an available bandwidth subscription on the at least one carrier network.

* * * * *